US006187849B1

(12) United States Patent
Nugent, Jr. et al.

(10) Patent No.: US 6,187,849 B1
(45) Date of Patent: Feb. 13, 2001

(54) TEMPORARY PROTECTIVE COATING

(75) Inventors: Richard M. Nugent, Jr., Allison Park; Dennis W. Jones; Michael J. Pawlik, both of Glenshaw; Ralph C. Gray, Butler, all of PA (US)

(73) Assignee: PPG Industries Ohio, Inc., Cleveland, OH (US)

( * ) Notice: Under 35 U.S.C. 154(b), the term of this patent shall be extended for 0 days.

(21) Appl. No.: 09/276,203

(22) Filed: Mar. 25, 1999

(51) Int. Cl.$^7$ .............................. C08L 91/06; C08K 5/34; C08K 5/01
(52) U.S. Cl. .................... 524/277; 524/96; 524/244; 524/245; 524/251; 524/487; 524/62
(58) Field of Search ..................... 524/244, 245, 524/251, 96, 277, 487, 62; 428/463

(56) References Cited

U.S. PATENT DOCUMENTS

| 4,942,193 | 7/1990 | Van Buskirk et al. | 524/276 |
| 5,066,521 | * 11/1991 | Morsy | 427/387 |
| 5,081,174 | 1/1992 | Van Buskirk | 524/277 |
| 5,229,450 | 7/1993 | Van Buskirk et al. | 524/487 |

* cited by examiner

Primary Examiner—Kriellion Sanders
(74) Attorney, Agent, or Firm—William J. Uhl

(57) ABSTRACT

Disclosed is a temporary, protective dry lubricating coating composition which when deposited and dried on a metallic substrate, is removable by contacting with an aqueous alkaline cleaning solution. The coating composition comprises (a) a wax present in an amount up to 20 weight percent; (b) a base-neutralized, acid functional polymer which is the polymerization reaction product of (i) a polymerizable, ethylenically unsaturated monomer having acid functionality and (ii) at least one polymerizable, ethylenically unsaturated monomer different from (i); and (c) an amine containing an acyclic moiety of from 8 to 30 carbon atoms, the amine being different from the base used to neutralize the acid functional polymer (b). The temporary protective coating is compatible with a wide range of adhesives and sealants used in the assembly of automobiles.

19 Claims, No Drawings

TEMPORARY PROTECTIVE COATING

FIELD OF INVENTION

The present invention relates to temporary protective coating compositions which are useful in the passivation of untreated metallic substrates. More specifically, the invention relates to formable, weldable aqueous temporary protective coatings which are compatible with the variety of adhesives and sealants used in the assembly of automobiles.

BACKGROUND OF THE INVENTION

Metallic substrates such as steel sheet which are produced in steel mills are treated shortly after manufacture to prevent rusting and corrosion of the sheet prior to being formed into the desired parts. Typically mill oils, such as FERROCITE 61 AUS available from Quaker Chemical Corp., DRAWCO FB 27 MC-1 available from Novamax Technologies, Inc., and MONTGOMERY DB 4265 available from Fuchs Lubricants Co. have been used for this purpose.

The mill oils are typically removed after the metallic substrates are formed into parts. Mill oils and film-forming materials, however, are often difficult to remove completely and can be incompatible with subsequently applied organic materials, for example, primer coatings, adhesives and sealants.

In place of mill oils, organic polymers have also been employed as passivating agents for steel sheet. These materials generally provide better corrosion resistance than do mill oils and are easier to remove. However, depending on the organic polymer used, small residual amounts can remain on the surface of the metallic substrate. Although compatible with most subsequently applied primer coatings, these organic polymer residues are often incompatible with subsequently applied adhesives and sealants which are used in the assembly of automobiles.

Temporary protective coating compositions are known in the art. U.S. Pat. No. 4,942,193 discloses a formable, weldable temporary protective coating for metallic substrates which comprises a neutralized acid or base-functional polymer prepared in the presence of a lubricating composition consisting essentially of a relatively high level of a wax. The coating is particularly useful to provide in-transit corrosion resistance.

U.S. Pat. No. 5,081,174 discloses a formable, weldable, removable coating for use on untreated metals comprised of a base-neutralized, acid fuctional copolymer, a wax lubricant and a removability enhancing material such as phosphoric acid present at additive levels to improve the removability of the coating from metallic substrates by aqueous alkaline cleaners. The coatings provide corrosion resistance, are formable and/or drawable, weldable by conventional means, and can be removed with alkaline cleaners.

U.S. Pat. No. 5,229,450 discloses formable, weldable temporary protective aqueous coating compositions useful in passivating untreated metallic substrates. The coatings are comprised of a neutralized acid or base-functional polymer and a lubricating composition in an amount sufficient to impart drawability and formability to the metallic substrates to which they are applied. The coatings provide corrosion resistance, are formable and/or drawable, and weldable by conventional means, and can be removed with alkaline cleaners.

Although the above-described temporary protective coatings provide excellent in-transit corrosion resistance, weldability and formability, the coatings are often incompatible with subsequently applied adhesives and sealants.

It has been found that by using a polymer having a relatively high level of acid functional monomer present, compatibility of the temporary protective coating with a wide variety of adhesives and sealants can be improved.

SUMMARY OF THE INVENTION

In accordance with the present invention, provided is a temporary protective coating composition which when deposited and dried on a metallic substrate, is removable by contacting with an aqueous alkaline cleaning solution, the coating comprising (a) a wax present in an amount up to 20 weight percent; (b) a base-neutralized, acid functional polymer which is the polymerization reaction product of (i) a polymerizable, ethylenically unsaturated monomer having acid functionality and (ii) at least one polymerizable ethylenically unsaturated monomer different from (i); and (c) an amine containing an acrylic moiety of from 8 to 30 carbon atoms, the amine being different from the base used to neutralize the acid functional polymer (b).

Other than in the operating examples, or where otherwise indicated, all numbers expressing quantities of ingredients or reaction conditions used in the specification or claims are to be understood as being modified in all instances by the term "about". Also, as used herein, the term "polymer" is meant to include oligomers.

DETAILED DESCRIPTION OF THE INVENTION

Examples of waxes suitable for use in the present invention include natural waxes such as petroleum waxes, e.g., paraffin waxes and hydrocarbon waxes; mineral waxes, e.g., montan wax; vegetable waxes, e.g., carnauba wax; and synthetic waxes such as Fischer-Tropsch waxes and polyethylene waxes. Preferably the wax component (a) is a hydrocarbon wax, more preferably a branched hydrocarbon wax having a melting point ranging from 40° C. to 90° C., preferably from 50° C. to 80° C., and more preferably 55° C. to 75° C.

Typically, the wax component (a) is present in the temporary protective coating of the invention in an amount up to 20 weight percent, preferably from 1 to 15 weight percent, and more preferably from 2 to 12 weight percent based on total solids content of the coating.

The temporary protective coating of the invention also comprises (b) a base-neutralized, acid functional polymer, the polymer comprising (i) a polymerizable, ethylenically unsaturated monomer having acid functionality and (ii) at least one other polymerizable, ethylenically unsaturated monomer different from (i).

Examples of suitable polymerizable, ethylenically unsaturated monomers having acid functionality include, but are not limited to, acrylic acid and or methacrylic acid (cumulatively referred to herein as "(meth)acrylic acid"), crotonic acid, itaconic acid, maleic and combinations thereof.

Examples of polymerizable, ethylenically unsaturated monomers different from (i) above suitable for use as component (ii) include alkyl esters of (meth)acrylic acid, for example methyl (meth)acrylate, ethyl (meth)acrylate, butyl (meth)acrylate, 2-ethyl hexyl (meth)acrylate and the like. Other suitable polymerizable, ethylenically unsaturated monomers include vinyl aromatic compounds, for example, styrene and vinyl toluene; nitriles such as acrylonitrile and methacrylonitrile; vinyl and vinylidine halides such as vinyl chloride and vinylidene fluoride; and vinyl esters such as vinyl acetate. Hydroxy alkyl esters of (meth)acrylic acid, for example hydroxyethyl (meth)acrylate and hydroxypropyl (meth)acrylate, may also be used.

In a preferred embodiment of the invention functional monomer (i) is acrylic acid and the polymerizable, ethylenically unsaturated (ii) is comprised of styrene and butylacrylate.

Typically, the polymerizable, ethylenically unsaturated monomer having acid functionality (i) is present in the base-neutralized acid functional polymer in an amount ranging from 10 to 50 weight percent, preferably from 20 to 40 weight percent, and more preferably from 25 to 35 weight percent based on total weight of monomers in the polymer.

Also, the polymerizable, ethylenically unsaturated monomer (ii) which is different than (i) is typically present in the base-neutralized acid functional polymer in an amount ranging from 90 to 50 weight percent, preferably from 80 to 60 weight percent, and more preferably from 75 to 65 weight percent based on total weight of monomers in the polymer.

The base-neutralized acid functional polymer (b) may be prepared by conventional free-radical solution polymerization techniques in the presence of suitable catalysts such as benzoyl peroxide, t-amyl peroxy-2-ethyl hexanoate or N,N-azobis (isobutyronitrile).

The polymerization is preferably carried out in the presence of the wax component (a) in an organic solvent in which the monomers and the wax are soluble. Preparation of the polymer in the presence of wax ensures that the wax component remains uniformly dispersed in the coating composition prior to application, with essentially no settling of wax particles upon standing.

The organic solvent can be any organic solvent or mixture of organic solvents in which the monomers and the wax are soluble, for example, alcohols such as ethanol, n-propanol, and butanol; glycol ethers such as ethylene glycol butyl ether and propylene glycol methyl ether; and esters such as butyl acetate and propylene glycol methyl ether acetate. Preferred are the lower reflux temperature solvents such as alcohols, for example ethanol and n-propanol The acid functional polymer thus prepared is at least partially neutralized using a base, preferably a volatile base, to render the polymer soluble or dispersible in aqueous media. By the term "volatile" is meant that the base evaporates from or is driven off from the applied coating as it is dried at ambient temperatures or force dried at elevated temperatures. Examples of volatile bases suitable for neutralizing the acid functional polymer include ammonia, including ammonium hydroxide, and primary or secondary amines such as ethanolamine, diethanolamine, n-methylethanolamine, dimethylethanolamine, methylamine, ethylamine, triethylamine and morpholine. Preferably, ammonia is used to neutralize the acid functional polymer.

As indicated above, the temporary protective coating of the invention further comprises (c) an amine having a long chain acyclic moiety containing from 8 to 30 carbon atoms, preferably from 10 to 20 carbon atoms and more preferably from 12 to 18 carbon atoms. The amine component (c) is different from the base used to neutralize the acid functional polymer as described above. More specifically, the amine component (c) can be a primary, secondary or tertiary amine having long chain aliphatic groups derived from fatty acids.

In a preferred embodiment of the invention, the amine component (c) is a tertiary amine having the general form (I)

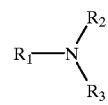

(I)

where $R_1$, $R_2$, $R_3$ are alkyl groups at least one of which is an acyclic moiety having from 12 to 18 carbon atoms. Preferably, the remaining two substituent groups are $C_1$ to $C_4$ alkyl. In a preferred embodiment of the invention, the amine component (b) is N,N-dimethyl-n-octadecyl amine.

Typically, the amine component (c) is present in the temporary protective coating of the invention in an amount up to 20 weight percent, preferably from 3 to 15 weight percent, and more preferably from 8 to 12 weight percent based on total solids content of the coating.

The polymerization may also be carried out in the presence of the amine component (c), or, alternatively, the amine component (c) may be post-added to the polymerization reaction product, either prior to or subsequent to neutralization with the volatile base. In a preferred embodiment, the acid functional polymer (b) is prepared in the presence of the amine component (c). Preparation of the polymer in the presence of the amine component (c) tends to minimize the increase in the viscosity of the polymer often noted with the use of higher levels of acid functional monomers. In a more preferred embodiment, the acid functional polymer (b) is prepared in the presence of the wax component (a) and the amine component (c).

The base-neutralized, acid functional polymer (b) which is employed with the temporary protective coating of the invention typically has a glass transition temperature (Tg) of −23° C. to 55° C., preferably of −4° C. to 27° C., and more preferably 3° C. to 18° C. Tg is described in PRINCIPALS OF POLYMER CHEMISTRY (1953) Cornell University Press. The Tg value can actually be measured or it can be calculated as described by Fox in BULL. of AMER. PHYS. SOC., 1,3, page 123 (1956). "Tg" as used herein refers to the calculated value.

Also, the acid functional polymer typically has a number average molecular weight ranging from 10,000 to 50,000, preferably from 15,000 to 40,000, and more preferably from 20,000 to 30,000 as determined by gel permeation chromatography using a polystyrene standard.

Typically, the base-neutralized, acid functional polymer (b) is present in an amount from 60 to 98 weight percent, preferably from 70 to 90 weight percent, and more preferably from 75 to 85 weight percent based on total solids content of the coating.

The temporary protective coating composition may optionally contain various additives such as defoamers, wetting agents or surfactants and additional cosolvents. Also, where applied film weights are relatively high, for example, 1.3 milligrams per square inch or higher, the coatings may contain an effective amount of a conductivity-enhancing additive, e.g., graphite, to facilitate welding.

The temporary protective coating of the invention may be applied to metallic substrates such as aluminum, cold rolled steel, electrogalvanized steel, hot dipped galvanized steel, electrozinc iron steel, and stainless steel by any conventional application means known in the art such as spraying, brushing, dipping, rollcoating, curtain coating or the like. The coating is typically applied at film weights of 100 to 800, preferably 150 to 500, and more preferably 200 to 350 milligrams per square foot. It should be appreciated that metallic substrates which are particularly porous or have a high degree of surface roughness may require application at a higher film weight.

As indicated above, applied temporary protective coatings can be air dried or force dried. Typically, the applied coatings are forced dried at temperatures ranging from 50° C. to 250° C., preferably from 70° C. to 200° C., and more preferably from 90° C. to 150° C.

Removal of the applied coating is effected by contacting the coated substrate with an aqueous alkaline solution. By "contacting" is meant spraying, flooding, immersion or the like. Examples of aqueous alkaline cleaners typically employed to remove the temporary, protective coating of the invention include CHEMKLEEN 163 and CHEMKLEEN 49, both commercially available from PPG Industries, Inc. The concentration of the aqueous alkaline cleaner is dependent on its nature, removal temperatures and the degree of neutralization of the coating by the cleaner. The temporary protective coatings of the invention are typically effectively removed by immersion cleaning at elevated temperatures. With the protective coating removed therefrom, the metallic substrate can be used without further treatment or can undergo other coating processes.

It should be appreciated that the temporary protective coating of the invention may be employed alone or in conjunction with relatively low levels of mill oils or other compatible lubricants applied thereto.

The following examples illustrate the invention and should not be construed as a limitation on the scope thereof. Unless specifically indicated otherwise, all percentages and amounts are by weight.

EXAMPLES

Example 1 describes the preparation of a comparative temporary protective coating composition which contains a base-neutralized polymer comprising a lower level of acid functional monomer than that of the inventive composition with no fatty amine. Example 2 describes the preparation of the temporary protective coating composition of Example 1 further comprising a tertiary amine having an 18 carbon fatty chain. Example 3 describes the preparation of a temporary protective coating composition which contains a base-neutralized polymer comprising a higher level of acid functional monomer, with no fatty amine, while Example 4 describes the preparation of the analogous fatty-amine containing composition. Example 5 describes the preparation of a temporary protective coating composition analogous to Example 4 but comprising a reduced wax level. Examples 6 and 7 describe the preparation of coating compositions analogous to Example 5, but which contain tertiary amines which have a 12 and a 16 carbon fatty chain, respectively.

Example 1

Comparative

This comparative example illustrates the preparation of a temporary protective coating composition which contains a base-neutralized polymer having an acid functional monomer level lower than that used in the inventive composition.

A reaction vessel equipped with a thermometer, stirrer, dropping funnels, reflux condenser and means for maintaining a blanket of nitrogen was charged at room temperature with a composition consisting of a mixture of 86.7 grams of ethanol, 80 grams of SP96 WAX (a microcrystalline petroleum wax having a softening point of about 60° C., available from Strahl & Piitsch Inc.) and 9.1 grams of SURFYNOL 104 (surfactant available from Air Products & Chemicals, Inc.). The composition was heated over a period of about 10–15 minutes to reflux. When the reflux temperature of 78° C. was attained, Charge A (a mixture of 424.1 grams of butyl acrylate, 216.2 grams of styrene, and 160 grams of acrylic acid) and Charge B (a mixture of 50.2 grams of ethanol and 25.7 grams of 95% t-amylperoxy 2-ethyl hexanoate) were added simultaneously. The addition continued for 3.5 hours while maintaining reflux. As the reflux temperature reached 92° C., Charge C (a mixture of 14.8 grams of ethanol and 3.6 grams of t-amylperoxy-2-ethyl hexanoate) was added and the reaction mixture was held at that temperature for 0.5 hour, then cooled to approximately 80° C. Charge D (a mixture of 279.7 grams of deionized water and 78.1 grams of ammonium hydroxide, a 28% $NH_3$ aqueous solution, was added below surface over a period of 15 minutes, immediately followed by the below surface addition of Charge E (8.9 grams of FOAMASTER SA-3 defoamer available from Henkel Corporation). Charge F, an additional 1566.3 grams of preheated deionized water, was then added to the reaction mixture over a period of 0.5 hour to a temperature of 76° C. to 80° C., and the reaction mixture was held at that temperature for 0.5 hour. The heat was removed and Charge G, a mixture of deionized water/PROXEL BD (biocide commercially available from ICI) 301.4 g/0.8 g., was added over a period of approximately 15 minutes, and the reaction was held for an additional 15 minutes thereafter. Charge H (a mixture of 110 g. deionized water, 3.4 g. ammonium hydroxide (28% solution) and 3.9 g. phosphoric acid (85% solution)) was added over a period of approximately 10 minutes. The reaction product thus obtained had a total solids content of 28.3% (1 hour @ 110° C.); 0.65 milliequivalents of acid per gram; 0.42 milliequivalents of base per gram; and a weight average molecular weight (Mw) of 47,533 as determined by gel permeation chromatography using a polystyrene standard.

Example 2

This comparative example describes the preparation of the temporary coating composition of Example 1 which further includes the addition of a tertiary fatty amine.

The procedure for this example was essentially the same as that for Example 1 except that 80 grams of ARMEEN DM18D (a tertiary amine having an 18 carbon fatty chain available from Akzo Nobel Chemicals, Inc.) was added with the initial charge, and additional deionized water was added to yield a reaction product having the same final solids content as that of Example 1.

Example 3

To a reaction vessel equipped with a thermometer, stirrer, dropping funnels, reflux condenser and means for maintaining a blanket of nitrogen was added at room temperature, a mixture of 97.3 g. deionized water, 76.1 g. ethanol, 84.2 g. SP96 WAX and 9.6 grams of SURFYNOL 104. The mixture was heated to reflux (81° C.) over a period of about 10–15 minutes. At reflux temperature the simultaneous addition of Charge A (a mixture of 337 g. butyl acrylate, 252.7 g. styrene, and 252.7 g. acrylic acid) and Charge B (a mixture of 52 g. ethanol and 27 g. 95% t-amylperoxy 2-ethyl hexanoate) was started and continued for 3.5 hours while maintaining reflux. When the reflux temperature reached 85° C., Charge C (a mixture of 15.6 grams of ethanol and 3.8 grams of t-amylperoxy-2-ethyl hexanoalte) was then added and the reaction mixture was held for 0.5 hour at reflux, then cooled to approximately 80° C. Charge D (a mixture of 184 g. deionized water and 80.7 g. ammonium hydroxide (28% solution in water) was added over a period of 15 minutes at which time Charge E(9.6 g. defoamer (FOAMASTER SA-3) was added. Charge F, an additional 10.35 g. preheated deionized water was added to the reaction mixture over a period of 0.5 hour and held at a temperature of 76° C. to 80° C. for 0.5 hour. At this time, the heat was removed and Charge G (a mixture of deionized water/PROXEL BD 593.8 g/3.3 g.) was added over a period of approximately 15 minutes and held for an additional 15 minutes thereafter. Charge H (a mixture of 532.1 g. deionized water, 3.6 g. ammonium hydroxide (28% solution), and 4.1 g. phosphoric acid (85% solution) was then added over a period of approximately 10 minutes. The reaction product thus obtained had a percent solids content of 26% (1 hour @ 110° C.); 0.93 milliequivalents of acid per gram; 0.37 milliequivalents of base per gram; a viscosity of 2835 centipoises per second (Brookfield, No. 3 spindle @ 20 revolutions per minute); a pH of 6.96; and a weight average molecular weight (Mw) of 48,685 as determined by gel permeation chromatography.

Example 4

This example illustrates the preparation of a temporary protective coating composition in accordance with the present invention. The procedure for this example was essentially the same as that for Example 3 except that 84.2 grams of ARMEEN DM18D was included in the initial charge and additional deionized water was added to yield a coating composition having the same final solids content as that of Example 3.

Example 5

This example illustrates the preparation of a temporary protective coating composition in accordance with the present invention. The procedure for this example was essentially the same as that for Example 3 except that the amount of SP96 WAX was reduced by one half (i.e., 42.1 grams) and 84.2 grams of ARMEEN DM18D was included in the initial charge. Additional deionized water was added to yield a coating composition having the same final solids content as that of Example 3.

Example 6

This example describes the preparation of a temporary protective coating composition in accordance with the present invention. The procedure for this example was essentially the same as that for Example 3 except that 97.8 grams of ARMEEN DM12D (a tertiary amine having an 12 carbon fatty chain available from Akzo Nobel Chemicals, Inc.) was is included in the initial charge. Additional deionized water was added to yield a coating composition having the same final solids content as that of Example 3.

Example 7

This example describes the preparation of a temporary protective coating composition in accordance with the present invention. The procedure for this example was essentially the same as that for Example 3 except that 97.8 grams of ARMEEN DM16D (a tertiary amine having a 16 carbon fatty chain available from Akzo Nobel Chemicals, Inc.) was included in the initial charge. Additional deionized water was added to yield a coating composition having the same final solids content as that of Example 3.

Testing Procedure

All of the temporary protective coating compositions of Examples 1–7 were applied to the various substrates indicated below using a #5 or a #7 drawdown rod (available from R.D.S. Webster, N.Y.) to achieve film weights of between 245 mg/ft$^2$ to 280 mg/ft$^2$. The coated substrates were then baked at a temperature of 350° F. (177° C.) for 30 seconds (peak metal temperature of about 200° F.).

Lap shear testing is typically used to determine the lap shear, or bond strength, of structural adhesives. As discussed above, a temporary protective coating, if not compatible with the adhesive, can negatively affect the lap shear strength of the adhesive by altering the adhesive failure mode.

Each of the temporary protective coating compositions of Examples 1 through 5 were applied to hot dipped galvanized steel and hot dipped galvannealed steel substrates as described above. Coated substrates were cut into 1"×4" test panels, and two of these test panels was used for each evaluation. Lap shear strength was tested for the epoxy adhesive, CEMEDINE EPA-2040 (available from Cemedine U.S.A., Inc.), and the PVC/epoxy adhesive, ESSEX 66613 (available from Essex Specialty Products, Inc.) using these test panels versus those to which a standard mill oil was applied. The commercial adhesive was applied to a 0.5 inch long section for the full width of the coated side of one 1"×4" test panel, and a second panel was affixed thereto (coated side toward the adhesive) with the adhesive sandwiched therebetween to a bond line thickness of 0.020 inches. The test panels were subjected to lap shear testing by pulling the bonded test panels apart using an DISTRON 5567 strength tester equipped with a 30 kN load cell. Lap shear strength, i.e, the force required to effectuate bonding failure, was reported in pounds per square inch (psi). If three or more bonds per substrate were made, standard deviations were also calculated. Lap shear for each of the Examples 1–5 is reported in the following Table 1.

Mode of failure is also reported. Percent cohesive failure ("co") is the percentage of broken bond surface having adhesive clinging to both sides. Cohesive failure, in this instance, is the most desirable mode of failure. Any bond surface showing clean metal exposure is considered adhesive failure ("ad"). This failure mode is undesirable and will usually result in disqualification of a lubricated substrate candidate from commercial application. A thin layer of adhesive clinging to one broken surface is considered thin-film cohesive failure ("tf"). This mode of failure is intermediate in desirability between adhesive and cohesive failure modes. If the failure occurs within a protective metal layer that is clad to the substrate base, for example, within the zinc layer of galvanized steel, the mode of failure is referred to as "substrate failure".

TABLE 1

| SUBSTRATE TESTED | TREATMENT | Cemedine EPA-2040.4 Epoxy Adhesive Lap Shear Strength[2] (% Failure Mode) | Essex 66613 PVC Epoxy Adhesive Lap Shear Strength[2] (% Failure Mode) |
|---|---|---|---|
| ACT HDG-G70 70U Hot Dipped Galvanized Steel | Mill oil[3] Control | 2061 psi (100% cohesive) | 681 psi (50% ad/50% tf) |
| ACT HDG-G70 70U Hot Dipped Galvanized Steel | Example 1 | 2481 psi (100% cohesive) | 854 psi (80% co/20% ad) |
| ACT HDG-G70 70U Hot Dipped Galvanized Steel | Example 2 | 2557 psi (100% cohesive) | 995 psi (95% co/5% ad) |
| ACT HDG-G70 70U Hot Dipped Galvanized Steel | Example 3 | 2473 psi (100% cohesive) | 882 psi (90% co/10% ad) |
| ACT HDG-G70 70U Hot Dipped Galvanized Steel | Example 4 | 2608 psi (100% cohesive) | 958 psi (100% cohesive) |
| ACT HDG-G70 70U Hot Dipped Galvanized Steel | Example 5 | 2426 psi (100% cohesive) | 941 psi (100% cohesive) |
| USX HDA Zn/Fe 2 sided Hot Dipped Galvanneal Steel | Mill oil[3] Control | 1198 psi (substrate failure) | 821 psi (100% cohesive) |
| USX HDA Zn/Fe 2 sided Hot Dipped Galvanneal Steel | Example 1 | 1485 psi (substrate failure) | 842 psi (70% co/30% ad) |
| USX HDA Zn/Fe 2 sided Hot Dipped Galvanneal Steel | Example 2 | 1466 psi (substrate failure) | 911 psi (85% co/15% ad) |
| USX HDA Zn/Fe 2 sided Hot Dipped Galvanneal Steel | Example 3 | 1499 psi (substrate failure) | 880 psi (70% co/30% ad) |
| USX HDA Zn/Fe 2 sided Hot Dipped Galvanneal Steel | Example 4 | 1378 psi (substrate failure) | 961 psi (100% cohesive) |
| USX HDA Zn/Fe 2 sided Hot Dipped Galvanneal Steel | Example 5 | 1561 psi (substrate failure) | 854 psi (100% cohesive) |

[1]Applied to appropriate substrates with a #5 or #7 Drawbar to achieve coating weights of between 245 mg/ft[2] and 280 mg/ft[2]
[2]Values based on the average of three lap shears.
[3]Quaker Ferrocoat 61A-US, available from Quaker Chemical Corporation; average coating weight was 100 mg/ft[2]

Although lap shear strength and mode of failure are both important factors in the qualification process, the strength requirement is considered to be met if the example equals or exceeds the strength measurement (for a given adhesive/substrate variable) of the mill oil controls. As illustrated in Table 1, with a high strength adhesive such as the CEMEDINE EPA-2040.4 epoxy-based structural adhesive, the temporary protective coating compositions of Examples 1–5 have similar and acceptable modes of failure. However when a lower strength adhesive such as the ESSEX 66613 PVC-epoxy adhesive is employed, moderate to significant differences are noted depending on the substrate used. With hot dipped galvanized steel (HDG) substrates, all examples show significant improvement in mode of failure when compared to the mill oil control.

The test results of Table 1 also illustrate that those temporary protective coating compositions which contain the fatty amine, ARMEEN DM18D, i.e., Examples 2, 4, and 5, show definite improvement over their respective counterparts which do not contain the fatty amine (see Example 2 versus Example 1, and Examples 4 and 5 versus Example 3). Additionally, although the mill oil control exhibits the desired cohesive failure mode on hot dipped galvannealed steel (HDA), the results of Table 1 for this substrate illustrate that the same aforementioned advantages are noted with the compositions of Examples 2, 4 and 5 versus the analogous compositions which do not contain the fatty amine.

Each of the temporary protective coating compositions of Examples 1 through 7 were applied to electrogalvanized steel substrates (EZQ) using the application methods described above. Lap shear strength was tested for the epoxy adhesive, CEMEDINE EPA-2040, and the PVC epoxy adhesive, ESSEX 66613, using the test panels versus panels to which a standard mill oil control was applied, in accordance with the above-described testing procedures. Lap shear and mode of failure for each is reported in the following Table 2.

TABLE 2

| SUBSTRATE TESTED | TREATMENT[1] | Cemedine EPA-2040.4 Epoxy Adhesive Lap Shear Strength[2] (% Failure Mode) | Essex 66613 PVC Epoxy Adhesive Lap Shear Strength[2] (% Failure Mode) |
|---|---|---|---|
| ACT EZG-60G 2-sided Electrogalvanized Steel | Mill oil[3] Control | 2218 psi (100% cohesive) | 718 psi (95% co/5% ad) |
| ACT EZG-60G 2-sided Electrogalvanized Steel | Example 1 | 2417 psi (100% cohesive) | 876 psi (95% co/5% ad) |
| ACT EZG-60G 2-sided Electrogalvanized Steel | Example 2 | 2375 psi (100% cohesive) | 874 psi (100% cohesive) |
| ACT EZG-60G 2-sided Electrogalvanized Steel | Example 3 | 2224 psi (100% cohesive) | 912 psi (50% co/50% ad) |

TABLE 2-continued

| SUBSTRATE TESTED | TREATMENT[1] | Cemedine EPA-2040.4 Epoxy Adhesive Lap Shear Strength[2] (% Failure Mode) | Essex 66613 PVC Epoxy Adhesive Lap Shear Strength[2] (% Failure Mode) |
|---|---|---|---|
| ACT EZG-60G 2-sided Electrogalvanized Steel | Example 4 | 2272 psi (100% cohesive) | 893 psi (100% cohesive) |
| ACT EZG-60G 2-sided Electrogalvanized Steel | Example 5 | 2199 psi (100% cohesive) | 919 psi (100% cohesive) |
| ACT EZG-60G 2-sided Electrogalvanized Steel | Example 6 | 2330 psi (100% cohesive) | 954 psi (100% cohesive) |
| ACT EZG-60G 2-sided Electrogalvanized Steel | Example 7 | 2275 psi (100% cohesive) | 865 psi (100% cohesive) |

[1]All examples applied to appropriate substrates with either a #5 or #7 to achieve coating weights of between 245 mg/ft² and 280 mg/ft².
[2]Values based on the average of three lap shears.
[3]Quaker Ferrocoat 61A-US; average coating weight was 100 mg/ft²

The results reported in Table 2 illustrate that the fatty amine containing temporary protective coating compositions of Examples 2, 4, 5 and 6–7 show a significant improvement in mode of failure when compared to the analogous coating compositions which do not contain a fatty amine.

We claim:

1. A coating composition which when deposited and dried on a metallic substrate, is removable by contacting with an aqueous alkaline cleaning solution, said coating composition comprising:
   (a) a wax present in an amount up to 20 weight percent;
   (b) a base-neutralized, acid functional polymer which is the polymerization reaction product of the following:
      (i) a polymerizable, ethylenically unsaturated monomer having acid functionality; and
      (ii) at least one polymerizable, ethylenically unsaturated monomer different from (i); and
   (c) an amine containing an acyclic moiety of from 8 to 30 carbon atoms, said amine being different from the base used to neutralize the acid functional polymer (b).

2. The coating composition of claim 1 wherein the acid functional polymer (b) is prepared in the presence of the wax (a).

3. The coating composition of claim 1 wherein the wax component (a) is selected from the group consisting of polyethylene wax, paraffin wax, carnauba wax, hydrocarbon wax and mixtures thereof.

4. The coating composition of claim 1 wherein the wax is a branched hydrocarbon wax having a melting point of 50° C. to 90° C.

5. The coating composition of claim 1 wherein the amine component (c) is an amine containing an acyclic moiety of from 12 to 18 carbon atoms.

6. The coating composition of claim 1 wherein the amine component (c) is an amine having the general formula:

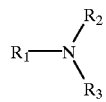

where $R_1$, $R_2$ and $R_3$ are alkyl groups at least one of which is an acyclic moiety of from 12 to 18 carbon atoms.

7. The coating composition of claim 6 wherein at least two of substituent groups $R_1$, $R_2$, or $R_3$ are alkyl groups having 1 to 4 carbon atoms.

8. The coating composition of claim 1 wherein the amine is N,N-dimethyl-n-octadecyl amine.

9. The coating composition of claim 1 wherein the acid functional polymer (b) is prepared in the presence of the wax (a) and the amine (c).

10. The coating composition of claim 1 wherein the acid functional polymer (b) is present in an amount of from 60 to 98 weight percent based on total solids content of the coating composition.

11. The coating composition of claim 1 wherein the polymerizable, ethylenically unsaturated monomer having acid functionality (i) is present in the polymer (b) in an amount ranging from 10 to 50 percent based on total weight of monomer.

12. The coating composition of claim 1 wherein the polymerizable, ethylenically unsaturated monomer having acid functionality (i) is selected from the group consisting of (meth)acrylic acid, crotonic acid, itaconic acid, maleic acid and combinations thereof.

13. The coating composition of claim 1 wherein (ii) the polymerizable, ethylenically unsaturated monomer different from (i) is selected from the group consisting of alkyl esters of (meth)acrylic acid, vinyl esters, vinyl aromatic compounds and combinations thereof.

14. The coating composition of claim 1 wherein the acid functional polymer (b) is neutralized with a volatile base.

15. The coating composition of claim 14 wherein the volatile base is selected from the group consisting of ammonia, ethanolamine, diethanolamine, N-methylethanolamine, dimethylethanolamine, methylamine, ethylamine, triethylamine, morpholine and mixtures thereof.

16. The coating composition of claim 1 wherein the acid functional polymer (b) has a Tg of −23° C. to 55° C.

17. The coating composition of claim 1 comprising:
   (a) 1 to 15 weight percent of a branched chain hydrocarbon wax;
   (b) 70 to 90 weight percent of a base-neutralized, acid functional polymer which is the polymerization reaction product of
      (i) 10 to 40 weight percent of a (meth)acrylic acid;
      (ii) 40 to 89 weight percent of an alkyl ester of (meth)acrylic acid; and
      (iii) 1 to 40 weight percent of a vinyl aromatic compound; and (c) 3 to 15 weight percent of a tertiary amine containing an acyclic moiety of from 12 to 18 carbon atoms, said amine being different from the base used to neutralize the acid functional polymer (b), the polymer (b) having a Tg of −4° C. to 27° C. and being prepared in the presence of the wax (a) and the amine (c).

18. A metallic substrate coated with the coating composition of claim 1.

19. A metallic substrate coated with the coating composition of claim 17.

* * * * *

UNITED STATES PATENT AND TRADEMARK OFFICE
CERTIFICATE OF CORRECTION

PATENT NO.   : 6,187,849 B1
DATED        : February 13, 2001
INVENTOR(S)  : Nugent, Jr. et al.

It is certified that error appears in the above-identified patent and that said Letters Patent is hereby corrected as shown below:

Column 11,
Line 46, delete the word "camauba" and insert -- carnauba --.

Signed and Sealed this

Twenty-seventh Day of August, 2002

Attest:

JAMES E. ROGAN
Attesting Officer
Director of the United States Patent and Trademark Office